United States Patent
Bergisch et al.

(10) Patent No.: US 10,078,901 B2
(45) Date of Patent: Sep. 18, 2018

(54) CAMERA ARRANGEMENT FOR MEASURING DISTANCE

(71) Applicant: Johnson Controls GmbH, Burscheid (DE)

(72) Inventors: Andreas Eppinger Bergisch, Gladbach (DE); Frank Schliep, Leverkusen (DE); Oliver Kirsch, Wuppertal (DE); Hannes Rene Boehm, Köln (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 384 days.

(21) Appl. No.: 14/370,719

(22) PCT Filed: Jan. 7, 2013

(86) PCT No.: PCT/EP2013/050129
§ 371 (c)(1),
(2) Date: Jul. 3, 2014

(87) PCT Pub. No.: WO2013/102677
PCT Pub. Date: Jul. 11, 2013

(65) Prior Publication Data
US 2015/0002664 A1 Jan. 1, 2015

(30) Foreign Application Priority Data

Jan. 20, 2012 (DE) .......... 10 2012 000 176
May 11, 2012 (DE) .......... 10 2012 207 931

(51) Int. Cl.
*H04N 7/18* (2006.01)
*G06T 7/00* (2017.01)
(Continued)

(52) U.S. Cl.
CPC .......... *G06T 7/004* (2013.01); *G01S 17/87* (2013.01); *G01S 17/89* (2013.01); *G06T 7/70* (2017.01);
(Continued)

(58) Field of Classification Search
CPC . G06T 7/004; G06T 7/70; H04N 5/33; H04N 7/183; G01S 17/87; G01S 17/89; G01S 7/4817
(Continued)

(56) References Cited

U.S. PATENT DOCUMENTS 5,086,411 A * 2/1992 Dalglish .............. G01S 17/89
356/2
6,041,186 A * 3/2000 Sensui .............. G02B 7/28
396/106
(Continued)

FOREIGN PATENT DOCUMENTS

CN 101044043 A 9/2007
CN 101130353 A 2/2008
(Continued)

OTHER PUBLICATIONS

Office Action dated Apr. 22, 2015, received in corresponding Japanese application No. 2014-549504 and English translation, 6 pages.
(Continued)

*Primary Examiner* — Y Lee
*Assistant Examiner* — Richard Carter
(74) *Attorney, Agent, or Firm* — Foley & Lardner LLP

(57) ABSTRACT

A camera arrangement includes at least one illuminating device for illuminating a plurality of fields of vision. At least one object to be detected is in each of the fields of vision. The camera arrangement also includes at least one objective lens for focusing a beam path which includes at least one of
(Continued)

the plurality of fields of vision or for focusing a plurality of beam paths each including at least one of the plurality of fields of vision. A TOF sensor is also provided. The at least one illuminating device, the at least one objective lens and the TOF sensor are arranged with respect to one another and with respect to the fields of vision and the objects in the latter in such a manner that images of the objects can be imaged on the one TOF sensor at the same time or in temporal succession.

5 Claims, 2 Drawing Sheets

(51) Int. Cl.
    *G01S 17/87*     (2006.01)
    *G01S 17/89*     (2006.01)
    *H04N 5/33*     (2006.01)
    *G06T 7/70*     (2017.01)
    *G01S 7/481*     (2006.01)

(52) U.S. Cl.
    CPC ............... *H04N 5/33* (2013.01); *H04N 7/183* (2013.01); *G01S 7/4817* (2013.01)

(58) Field of Classification Search
    USPC ............... 348/142, 135, 159; 340/435, 937; 382/103; 396/106; 463/32; 356/2
    See application file for complete search history.

(56) References Cited

U.S. PATENT DOCUMENTS

| | | | |
|---|---|---|---|
| 8,803,967 B2 * | 8/2014 | Oggier | G01S 7/4814 348/135 |
| 2008/0048887 A1 * | 2/2008 | Aoki | G01S 7/4802 340/937 |
| 2008/0074894 A1 | 3/2008 | Decoster et al. | |
| 2010/0128109 A1 | 5/2010 | Banks | |
| 2010/0165323 A1 | 7/2010 | Fiess et al. | |
| 2010/0283842 A1 | 11/2010 | Guissin et al. | |
| 2011/0109748 A1 * | 5/2011 | Lee | G01S 7/4811 348/159 |
| 2011/0215915 A1 * | 9/2011 | Lee | B60Q 1/00 340/435 |
| 2011/0228251 A1 * | 9/2011 | Yee | G06T 7/0057 356/5.01 |
| 2013/0107016 A1 * | 5/2013 | Federspiel | H04N 13/0253 348/49 |
| 2013/0116049 A1 * | 5/2013 | Pellman | A63F 13/213 463/32 |
| 2013/0148845 A1 * | 6/2013 | Maeda | G01S 17/023 382/103 |
| 2013/0220392 A1 * | 8/2013 | Gassert | A61H 3/061 135/66 |
| 2014/0078514 A1 * | 3/2014 | Zhu | G01B 11/24 356/606 |

FOREIGN PATENT DOCUMENTS

| | | |
|---|---|---|
| DE | 102009001159 A1 | 9/2010 |
| JP | H1141510 A | 2/1999 |
| JP | 2005-070447 A | 3/2005 |
| JP | 2006-224856 A | 8/2006 |
| JP | 2008-052029 A | 3/2008 |

OTHER PUBLICATIONS

International Search Report received in corresponding International Application No. PCT/EP2013/050129.

Office Action dated Aug. 7, 2015, received in corresponding Chinese application No. 201380004870.X, and English translation, 14 pages.

Office Action dated Oct. 3, 2017, received in corresponding Japanese application No. 2016-142964 (3 pages) and English translation (3 pages).

* cited by examiner

CAMERA ARRANGEMENT FOR MEASURING DISTANCE

CROSS REFERENCE TO RELATED APPLICATIONS

The present application is a U.S. National Stage of International Application No. PCT/EP2013/050129 filed on Jan. 7, 2013, which claims the benefit of German Patent Application No. 10 2012 000 176.2 filed on Jan. 7, 2012, and German Patent Application No. 10 2012 207 931.9 filed on May 11, 2012, the entire disclosures of all of which are incorporated herein by reference.

The invention relates to a camera arrangement and to a use of such a camera arrangement.

So-called TOF cameras (time-of-flight cameras) are known, which actively illuminate a scene, for example by means of infrared light, and determine the time of flight of the light used for the illumination by means of a sensor. On the basis of this, a distance of the illuminated object from the camera is then determined. Many of these TOF cameras can suppress background light which does not come from the camera light source.

DE 10 2009 001 159 A1 discloses a camera for detecting electromagnetic radiation in a first frequency range, comprising an electro-optical crystal, an analyzer and a detector array having a multiplicity of detectors for detecting electromagnetic radiation in a second frequency range. The analyzer is arranged between the electro-optical crystal and the detector array in the beam direction of the electromagnetic radiation in the second frequency range. A multiplicity of the detectors of the detector array respectively comprise a device for demodulating the electromagnetic radiation in the second frequency range.

It is an object of the present invention to provide a camera arrangement, which is improved in comparison with the prior art, and a use of such a camera arrangement.

The object is achieved according to the invention in respect of the camera arrangement by the features specified in claim 1, and in respect of the use by the features specified in claim 9.

According to the invention, the camera arrangement comprises at least one illumination device for illuminating a plurality of fields of view, at least one object to be detected respectively lying in the fields of view. According to the invention, the camera arrangement furthermore comprises at least one objective lens for focusing a beam path which comprises at least one of the plurality of fields of view. As an alternative, according to the invention the camera arrangement comprises at least one objective lens for focusing a plurality of beam paths, which respectively comprise at least one of the plurality of fields of view. According to the invention, the camera arrangement furthermore comprises a TOF sensor, the at least one illumination device, the at least one objective lens and the TOF sensor being arranged with respect to one another, and with respect to the fields of view and the objects lying therein, in such a way that images of the objects can be imaged simultaneously or in chronological succession on the one TOF sensor.

The camera arrangement is therefore formed in such a way that two or more fields of view (FOV) can be acquired with a single TOF sensor chip. This may be done by spatial superposition or by time division multiplexed methods.

It is advantageous in this case that only a single TOF sensor chip is required in order to detect a plurality of scenes. In this way, the camera arrangement can be configured more economically in comparison with one TOF sensor chip per scene.

In one refinement of the invention, two illumination devices are provided, a field of view respectively being illuminable by means of each illumination device, an objective lens respectively being arranged between the objects and the TOF sensor, and images of the objects being imagable in an at least partially common region on the TOF sensor. In this case, the two illumination devices are in particular coupled to a control device, the illumination devices being activatable independently of one another at different times by means of the control device.

In this case, two fields of view of two scenes are imaged simultaneously on one sensor. A superposition of the two images is thereby formed on the sensor chip. In order to image both fields of view, a beam splitter may be used. Nevertheless, other arrangements are possible for achieving superposed imaging of two fields of view on the sensor chip.

The TOF camera arrangement illuminates the scene actively and suppresses background light. By switching the illumination respectively onto only one of the scenes, the unilluminated scene is blocked out and only the field of view of the scene currently being illuminated is detected.

According to one configuration of the invention, one illumination device is provided, the fields of view being illuminable by means of the illumination device, a common objective lens being arranged between the objects and the TOF sensor, and images of the objects lying in the fields of view being imagable separately in different regions on the TOF sensor.

This means that the two fields of view are imaged on different regions of the sensor chip. In this way, both fields of view can be detected simultaneously.

In another configuration, two illumination devices are provided, a field of view respectively being illuminable by means of each illumination device, a common objective lens being arranged between the objects and the TOF sensor, and a controllable mirror being arranged between the objects and the objective lens, the mirror being controllable in such a way that either a beam path of a first field of view or a beam path of a second field of view can be delivered by means of it to the objective lens, and images of the objects being imagable in a common region on the TOF sensor.

In this case, the two illumination devices are again preferably coupled to a control device, the illumination devices being activatable independently of one another at different times by means of the control device. In particular, a first illumination device can be activated at a first time when the beam path of the first field of view is imaged on the TOF sensor by means of the mirror. A second illumination device can be activated in particular at a second time when the beam path of the second field of view is imaged on the TOF sensor by means of the mirror.

The regions of view are therefore detected by aiming the camera arrangement sequentially at different scenes. Each of the scenes only needs to be illuminated when the camera field of view is currently aimed at it.

According to one refinement of the invention, the mirror is a digital mirror, in particular a micromirror (so-called MEMS—microelectromechanical systems).

The camera arrangement may, for example, be used for distance measurement, a distance from the camera arrangement to the at least one object lying in the respective field of view being determinable from a time of flight of light emitted by means of the at least one illumination device to the fields of view.

In one refinement, the camera arrangement is used in a vehicle in order to monitor the heads of a driver and a passenger with only one TOF sensor. Furthermore, gestures, expressions, eye positions, viewing directions, seat positions, head positions and/or anthropometric features of the driver and/or passenger may be monitored inside the vehicle. The gestures are in particular hand gestures.

The invention will be explained in more detail with the aid of the appended schematic figures.

Figure 1:
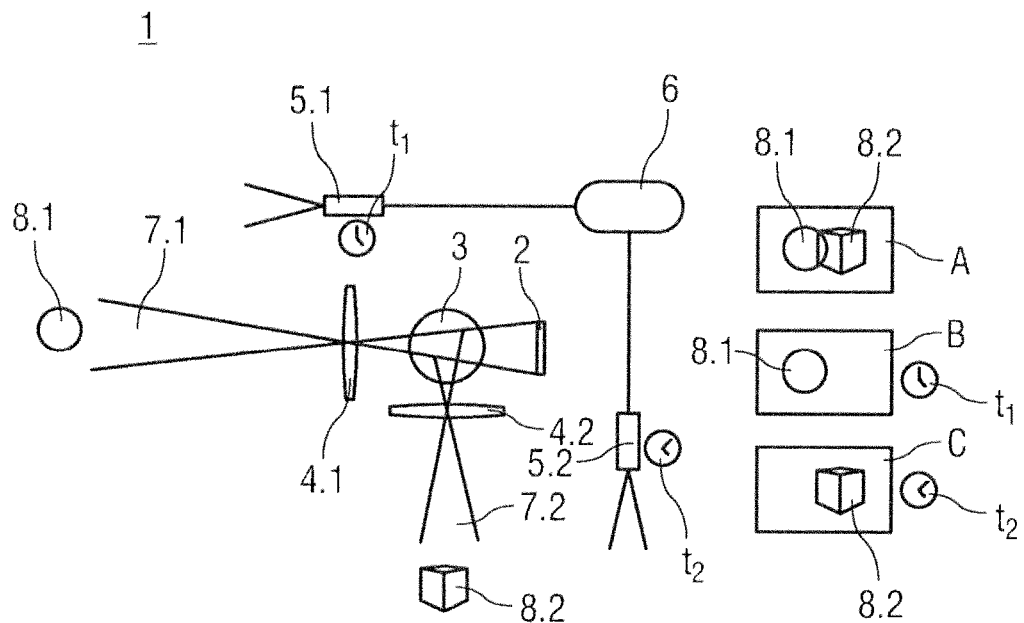
FIG. 1 is a schematic view of a first embodiment of a camera arrangement.

FIG. 1 shows a schematic view of a first embodiment of a camera arrangement 1, comprising a TOF sensor 2, a beam splitter 3, two objective lenses 4.1 and 4.2, two illumination devices 5.1, 5.2, and a control device 6.

The objectives lens 4.1 focuses a beam path of a first field of view 7.1, in which a first object 8.1 to be detected lies.

The objective lens 4.2 focuses a beam path of a second field of view 7.2, in which a second object 8.2 to be detected lies.

The focused beam paths from the two objective lenses 4.1, 4.2 are delivered to the beam splitter 3 from different directions, superposed on one another there and imaged onto the TOF sensor 2.

The illumination device 5.1 is arranged in order to illuminate the first field of view 7.1.

The illumination device 5.2 is arranged in order to illuminate the second field of view 7.2.

The control device 6 controls the illumination devices 5.1, 5.2, preferably in such a way that in each case only one of the fields of view 7.1, 7.2 is illuminated at a time $t_1$, $t_2$.

The camera arrangement 1 is formed in such a way that background light is at least predominantly suppressed, and only light coming from the illumination devices 5.1, 5.2 and reflected by the object 8.1, 8.2 is detected.

In the case of illuminating both fields of view 7.1, 7.2, the TOF sensor 2 would detect both objects 8.1, 8.2 superposed on one another, so that an image A would be formed.

In the case of illuminating only the field of view 7.1 at a time $t_1$, an image B on which only the object 8.1 is visible is formed on the TOF sensor 2, so that the distance to this object can be determined by means of time-of-flight determination of the light.

In the case of illuminating only the field of view 7.2 at a time $t_2$, an image C on which only the object 8.2 is visible is formed on the TOF sensor 2, so that the distance to this object can be determined by means of time-of-flight determination of the light.

Figure 2:
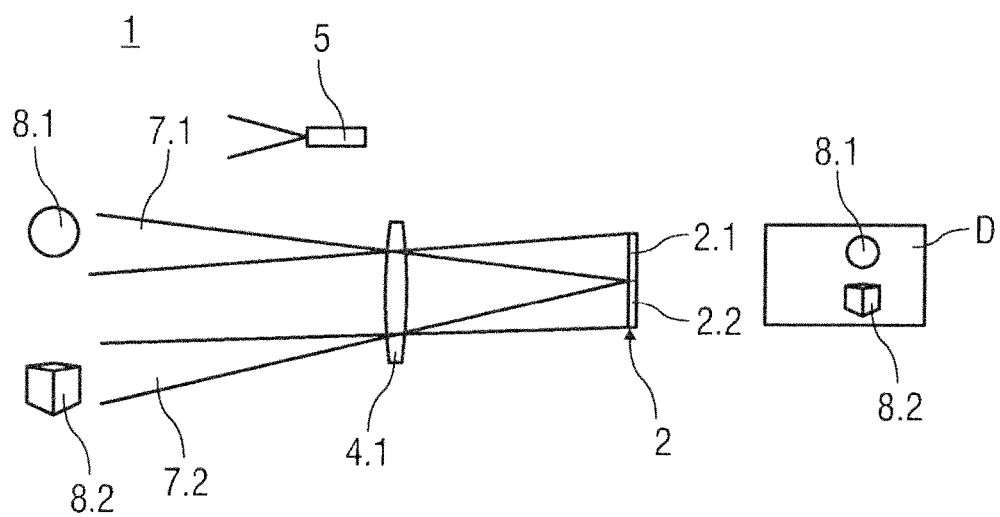
FIG. 2 is a schematic view of a second embodiment of a camera arrangement.

FIG. 2 shows a schematic view of a second embodiment of a camera arrangement 1, comprising a TOF sensor 2, an objective lens 4 and an illumination device 5.

The objective lens 4.1 focuses a beam path which comprises two fields of view 7.1, 7.2, a first object 8.1 to be detected lying in the field of view 7.1 and a second object 8.2 to be detected lying in the field of view 7.2.

The focused beam path is imaged onto the TOF sensor 2, but in such a way that the field of view 7.1 is imaged on a first region 2.1 of the TOF sensor 2 and the field of view 7.2 is imaged on a second region 2.2 of the TOF sensor 2.

The illumination device 5 is arranged in order to illuminate both fields of view 7.1, 7.2.

The camera arrangement 1 is formed in such a way that background light is at least predominantly suppressed, and only light coming from the illumination device 5 and reflected by the object 8.1, 8.2 is detected.

An image D, on which the two objects 8.1, 8.2 are visible in separate regions, is formed on the TOF sensor 2, so that the respective distances to these objects can be determined by means of time-of-flight determination of the light.

Figure 3:
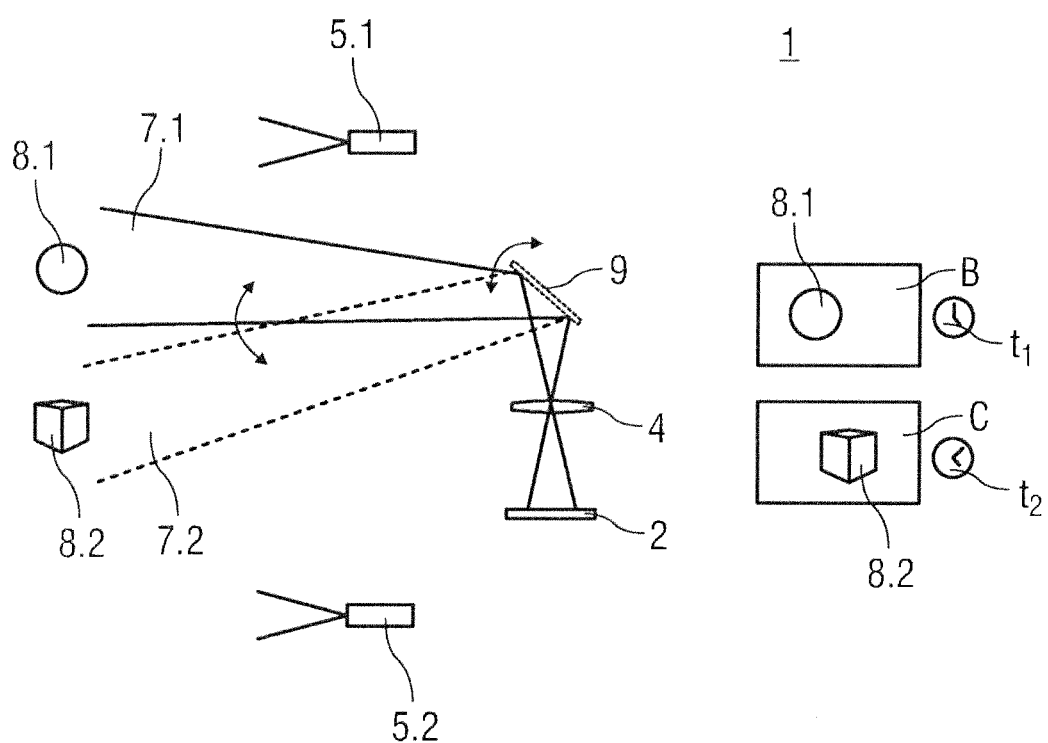
FIG. 3 is a schematic view of a third embodiment of a camera arrangement.

FIG. 3 shows a schematic view of a third embodiment of a camera arrangement 1, comprising a TOF sensor 2, an objective lens 4, two illumination devices 5.1, 5.2, a control device (not represented) and a controllable mirror 9.

The mirror 9 can be controlled by the control device in such a way that it delivers either a beam path of a first field of view 7.1, in which a first object 8.1 to be detected lies, or a beam path of a second field of view 7.2, in which a second object 8.2 to be detected lies, to the objective lens 4. The latter focuses the beam path and images it onto the TOF sensor 2.

The illumination device 5.1 is arranged in order to illuminate the first field of view 7.1.

The illumination device 5.2 is arranged in order to illuminate the second field of view 7.2.

The camera arrangement 1 is formed in such a way that background light is at least predominantly suppressed, and only light coming from the illumination devices 5.1, 5.2 and reflected by the object 8.1, 8.2 is detected.

When the mirror 9 is aimed at the field of view 7.1 at a time $t_1$, an image B on which only the object 8.1 is visible is formed on the TOF sensor 2, so that the distance to this object can be determined by means of time-of-flight determination of the light.

When the mirror 9 is aimed at the field of view 7.2 at a time $t_2$, an image C on which only the object 8.2 is visible is formed on the TOF sensor 2, so that the distance to this image can be determined by means of time-of-flight determination of the light.

The control device 6 can preferably control the illumination devices 5.1, 5.2 in such a way that in each case only one of the fields of view 7.1, 7.2 is illuminated at a time.

LIST OF REFERENCES 1 camera arrangement
2 TOF sensor
2.1, 2.2 region
3 beam splitter
4, 4.1, 4.2 objective lens
5, 5.1, 5.2 illumination device
6 control device
7.1, 7.2 field of view
8.1, 8.2 object to be detected
9 mirror
A, B, C, D image
$t_1$, $t_2$ time

The invention claimed is:

1. A camera arrangement, comprising:
one illumination device for illuminating a plurality of fields of view, at least one object to be detected respectively lying in each of the fields of view;
a time-of-flight (TOF) sensor; and
a common objective lens arranged between the objects and the TOF sensor, wherein the one illumination device, the common objective lens, and the TOF sensor are arranged with respect to one another, and with respect to the fields of view and the objects lying therein, in such a way that images of the objects can be imaged simultaneously or in chronological succession on the one TOF sensor, and wherein images of the at least one object respectively lying in each of the plurality of fields of view are imagable separately in different regions on the one TOF sensor, the common objective lens is configured to focus a first beam path of a first field of view on a first region on the one TOF sensor, and the common objective lens is configured to focus a second beam path of a second field of view on a second region on the one TOF sensor which does not overlap the first field of view; and wherein the illumination device is arranged outside the first or second beam paths between the object and the one TOF sensor, and a control unit is configured to measure a round trip time of the light from the illumination device to the object and, based on the measured round trip time of the light a distance of the object to the camera arrangement;

wherein a head of a driver and/or a head of a passenger, gestures, expressions, eye positions, viewing directions, seat positions, head positions and/or anthropometric features of the driver and/or passenger is or are monitored inside a vehicle; and wherein the camera arrangement is configured such that background light is at least predominantly suppressed and only light coming from the one illumination device and reflected by the at least one object is detected.

2. A camera arrangement, comprising:

two illumination devices for illuminating a plurality of fields of view, a field of view respectively being illuminable by each illumination device, at least one object to be detected respectively lying in each of the fields of view;

a time-of-flight (TOF) sensor;

a common objective lens arranged between the objects and the one TOF sensor; and a controllable mirror being arranged between the objects and the common objective lens, wherein the two illumination devices, the common objective lens, and the one TOF sensor are arranged with respect to one another, and with respect to the fields of view and the objects lying therein, in such a way that images of the objects can be imaged in chronological succession on the one TOF sensor, and wherein the controllable mirror is controllable in such a way that either a beam path of a first field of view between a first object of the at least one object lying in the first field of view and the one TOF sensor or a beam path of a second field of view between a second object of the at least one object lying in the second field of view and the one TOF sensor can be delivered thereby to the objective lens, the controllable mirror configured to be aimed at a first object of the first field of view at a first time or a second object of the second field of view at a second time, and images of the at least one object respectively lying in each of the plurality of fields of view being imagable in a common region on the one TOF sensor; wherein when the controllable mirror is aimed at the first field of view, an image in which only the at least one object lying in the first field of view is visible is formed on the one TOF sensor, and when the controllable mirror is aimed at the second field of view, an image in which only the at least one object lying in the second field of view is visible is formed on the one TOF sensor; and wherein the two illumination devices are arranged outside the beam path of the first field of view and outside the beam path of the second field of view, and a control unit is configured to measure a round trip time of the light from each illumination device to each respective object of the at least one object respectively lying in each of the fields of view and, based on the measured round trip time of the light, a distance of the respective object to the camera arrangement.

3. The camera arrangement as claimed in claim 2, wherein the two illumination devices are coupled to a control device, the two illumination devices being activatable independent of one another at different times by the control device.

4. The camera arrangement as claimed in claim 2, wherein a first illumination device can be activated at a first time when the beam path of the first field of view is imaged on the TOF sensor by the mirror, and a second illumination device can be activated at a second time when the beam path of the second field of view is imaged on the TOF sensor by the mirror.

5. The camera arrangement as claimed in claim 2, wherein the mirror is a digital mirror.

* * * * *